(12) United States Patent
Choi et al.

(10) Patent No.: US 11,989,451 B2
(45) Date of Patent: May 21, 2024

(54) METHOD OF OPERATING A MEMORY CONTROLLER IN WHICH COMMANDS ARE STORED IN URGENT OR NORMAL QUEUES BASED ON PRIORITY. A NONVOLATILE MEMORY DEVICE INCLUDING A BUFFER SELECTOR AND A STORAGE DEVICE THEREOF

(71) Applicant: SAMSUNG ELECTRONICS CO., LTD., Suwon-si (KR)

(72) Inventors: Wan-Soo Choi, Hwaseong-si (KR); Young Wook Kim, Hwaseong-si (KR); Hyun Seon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 17/494,007

(22) Filed: Oct. 5, 2021

(65) Prior Publication Data
US 2022/0206716 A1  Jun. 30, 2022

(30) Foreign Application Priority Data
Dec. 29, 2020  (KR) .......................... 10-2020-0186245

(51) Int. Cl.
*G06F 3/06*  (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0656; G06F 13/1642; G06F 13/1673; G06F 13/18; G11C 8/08; G11C 7/106; G11C 7/1087; G11C 7/12
See application file for complete search history.

(56) References Cited

U.S. PATENT DOCUMENTS

| 7,313,028 | B2 | 12/2007 | Ju |
| 8,495,332 | B2 | 7/2013 | Wakrat et al. |
| 8,850,103 | B2 | 9/2014 | Bennett |
| 9,753,653 | B2 | 9/2017 | Ellis et al. |
| 10,423,508 | B2 | 9/2019 | Li |
| 10,593,390 | B2 | 3/2020 | Ware et al. |
| 2016/0350385 | A1* | 12/2016 | Poder ................. G06F 16/2455 |
| 2018/0024772 | A1* | 1/2018 | Madraswala ......... G06F 3/0679 711/103 |
| 2018/0307503 | A1* | 10/2018 | Peltz ..................... G06F 13/161 |
| 2019/0155546 | A1* | 5/2019 | Cai ....................... G06F 3/0659 |
| 2019/0227745 | A1* | 7/2019 | Hong .................... G06F 3/0616 |

(Continued)

FOREIGN PATENT DOCUMENTS

WO  2014196753  12/2014

*Primary Examiner* — Rocio Del Mar Perez-Velez
*Assistant Examiner* — Tong B. Vo
(74) *Attorney, Agent, or Firm* — F. Chau & Associates, LLC

(57) ABSTRACT

A method for operating a memory controller, the method including: receiving a first command from a first host; storing the first command in a queue; when the first command has a higher priority than a second command currently being performed, pausing an operation of the second command and performing a read operation of the first command; and continuing the operation of the second command after completion of the read operation of the first command.

13 Claims, 11 Drawing Sheets

(56) References Cited

U.S. PATENT DOCUMENTS

| | | |
|---|---|---|
| 2019/0272217 A1* | 9/2019 | Lee .................... G06F 11/0784 |
| 2019/0310795 A1 | 10/2019 | Mathada et al. |
| 2020/0117378 A1* | 4/2020 | Hsu ...................... G06F 3/0619 |
| 2020/0142793 A1* | 5/2020 | Zapotylok ............. G06F 3/0659 |
| 2020/0326879 A1* | 10/2020 | Zhang ................. G06F 12/0246 |

* cited by examiner

METHOD OF OPERATING A MEMORY CONTROLLER IN WHICH COMMANDS ARE STORED IN URGENT OR NORMAL QUEUES BASED ON PRIORITY. A NONVOLATILE MEMORY DEVICE INCLUDING A BUFFER SELECTOR AND A STORAGE DEVICE THEREOF

This application claims priority under 35 U.S.C. § 119 to Korean Patent Application No. 10-2020-0186245 filed on Dec. 29, 2020 in the Korean Intellectual Property Office, the disclosure of which is incorporated by reference herein in its entirety.

TECHNICAL FIELD

The present inventive concept relates to a storage controller and a nonvolatile memory device.

DESCRIPTION OF THE RELATED ART

Flash memory is an electronic non-volatile computer memory storage medium that can be electrically erased and programmed. A flash memory stores data by changing threshold voltages of memory cells, and reads the data, using a predetermined read level. Recently, storage devices including a flash memory such as a Solid State Drive (SSD) and a memory card have been widely used. This is because the flash memory is a nonvolatile element and has excellent characteristics such as low power consumption and a high integration.

A memory controller controls operations of the flash memory. The memory controller receives commands from a plurality of hosts and performs an operation of the command according to a sequence in which the commands are received.

SUMMARY

Embodiments of the present inventive concept provide a memory controller capable of receiving a plurality of commands and reducing data access latency according to a host request in a complex workload situation.

Embodiments of the present inventive concept also provide a nonvolatile memory device capable of receiving a plurality of commands and reducing data access latency according to a host request in a complex workload situation.

An embodiment of the present inventive concept provides a method for operating a memory controller, the method including: receiving a first command from a first host; storing the first command in a queue; when the first command has a higher priority than a second command currently being performed, pausing an operation of the second command and performing a read operation of the first command; and continuing the operation of the second command after completion of the read operation of the first command.

An embodiment of the present inventive concept provides a memory controller including: a host interface which receives a plurality of commands and outputs data corresponding to the commands; a queue which stores the commands received at the host interface; a scheduler which schedules an operation sequence depending on a priority of the commands in the queue; and a central processing unit (CPU) which reads data from a nonvolatile memory device according to the commands in the queue on the basis of the scheduled sequence, wherein when a first command is received that is more urgent than a second command currently being performed, an operation of the second command is held, and an operation of the first command is performed.

An embodiment of the present inventive concept provides a nonvolatile memory device that includes: a memory cell array which includes a plurality of memory cells and stores data; a plurality of page buffers which store the data read from the memory cell array; a command control unit which in response to a first command, postpones an operation of a second command currently being performed and performs an operation of the first command; a buffer selector which selects one of a plurality of page buffers to store data corresponding to the first command or the second command, under control of the command control unit; and an output control unit which outputs data of a selected page buffer under control of the command control unit.

An embodiment of the present inventive concept provides a data center including: a first host which sends a first read command; a second host which sends a second read command; and a storage device which generates a plurality of tasks corresponding to the first and second read commands, and schedules an operation sequence of the tasks according to a priority to perform an operation, wherein when a more urgent second task is received while an operation of the first task is being performed, the storage device performs the operation of the second task before completing the operation of the first task, and then continues the operation of the first task.

DETAILED DESCRIPTION OF THE EMBODIMENTS

Figure 1:
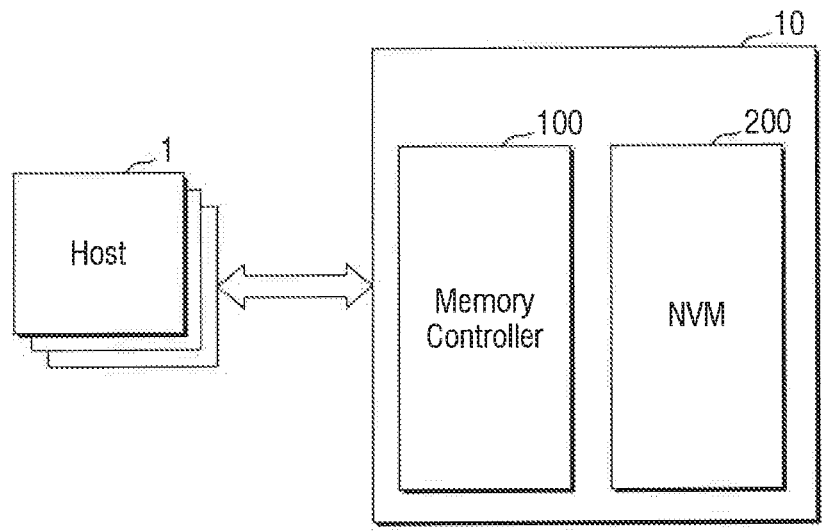
FIG. 1 is a diagram for explaining a storage system according to some embodiments of the present inventive concept.

FIG. 1 is a diagram for explaining a storage system according to some embodiments of the present inventive concept.

The storage system may include a host 1 and a storage device 10. Further, the storage device 10 may include a memory controller 100 and a nonvolatile memory device (NVM) 200. Further, according to an exemplary embodiment of the present inventive concept, the host 1 may be a plurality of hosts.

The storage device 10 may include a storage medium for storing data in response to the request from the host 1. As an example, the storage device 10 may include at least one of a Solid State Drive (SSD), an embedded memory, and a detachable external memory. When the storage device 10 is an SSD, the storage device 10 may be a device that complies with a nonvolatile memory express (NVMe) standard. If the storage device 10 is an embedded memory or an external memory, the storage device 10 may be a device that complies with a universal flash storage (UFS) or an embedded multi-media card (eMMC) standard. The host 1 and the storage device 10 may each generate and send packets according to the standard protocol being employed.

The memory controller 100 controls driving of the nonvolatile memory device 200. The memory controller 100 may perform operations of reading data from the nonvolatile memory device 200 and writing or deleting the data. In addition, the memory controller 100 may perform a memory access operation of the nonvolatile memory device 200, and various background operations for management. The specific details of the memory controller 100 will be described referring to FIG. 3 below.

When the nonvolatile memory device 200 of the storage device 10 includes a flash memory, the flash memory may include a two-dimensional (2D) NAND memory array or a three-dimensional (3D) (or vertical) NAND (VNAND) memory array. As another example, the storage device 10 may include various other types of nonvolatile memories. For example, a Magnetic Random Access Memory (MRAM), a spin-transfer torque MRAM, a conductive bridging RAM (CBRAM), a Ferroelectric RAM (FeRAM), a Phase Change RAM (PRAM), a resistive memory (RRAM) and various other types of memories may be applied to the storage device 10. The specific details of the nonvolatile memory device 200 will be described in FIG. 10.

Figure 2:
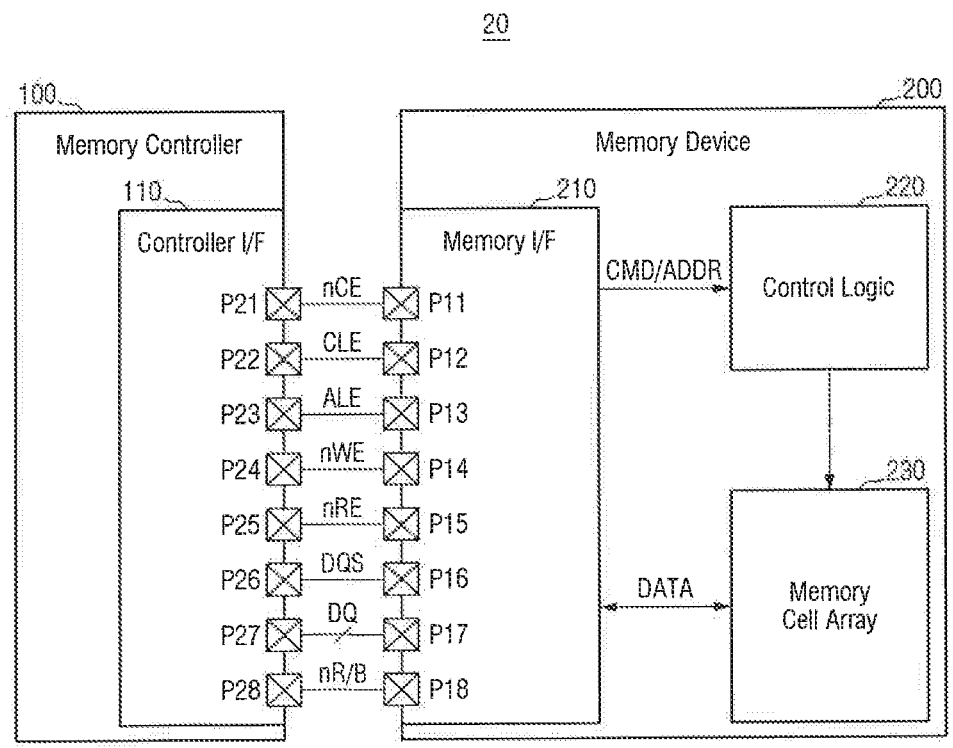
FIG. 2 is a diagram for explaining a storage device according to some embodiments of the present inventive concept.

FIG. 2 is a diagram for explaining a storage device according to some embodiments of the present inventive concept.

Referring to FIG. 2, the storage device 20 may include a nonvolatile memory device 200 and a memory controller 100. The nonvolatile memory device 200 may correspond to one of nonvolatile memory devices NVM11 to NVMmn that communicate with the memory controller 100 via one of a plurality of channels CH1 to CHm. The nonvolatile memory device 200 may include first, second, third, fourth, fifth, sixth, seventh and eighth pins P11, P12, P13, P14, P15, P16, P17 and P18, a memory interface circuit 210, control logic 220, and a memory cell array 230.

The memory interface circuit 210 may receive a chip enable signal nCE from the memory controller 100 through the first pin P11. The memory interface circuit 210 may send and receive signals to and from the memory controller 100 through the second to eighth pins P12 to P18 according to the chip enable signal nCE. For example, when the chip enable signal nCE is in an enable state (e.g., a low level), the memory interface circuit 210 may send and receive signals to and from the memory controller 100 through the second to eighth pins P12 to P18.

The memory interface circuit 210 may receive a command latch enable signal CLE, an address latch enable signal ALE, and a write enable signal nWE from the memory controller 100 through the second to fourth pins P12 to P14. The memory interface circuit 210 may receive a data signal DQ from the memory controller 100 or send the data signal DQ to the memory controller 100 through a seventh pin P17. The command CMD, the address ADDR, and the data DATA may be transferred through the data signal DQ. For example, the data signal DQ may be transferred through a plurality of data signal lines. In this case, the seventh pin P17 may include a plurality of pins corresponding to the plurality of data signal lines.

The memory interface circuit 210 may acquire the command CMD from the data signal DQ received in an enable state (e.g., a high level state) of the command latch enable signal CLE on the basis of toggle timings of the write enable signal nWE. The memory interface circuit 210 may acquire the address ADDR from the data signal DQ received in the enable state (e.g., a high level state) of the address latch enable signal ALE on the basis of the toggle timings of the write enable signal nWE.

In an exemplary embodiment of the present inventive concept, the write enable signal nWE holds (e.g., maintains) a static state (e.g., a high level or a low level) and then may be toggled between the high level and the low level. For example, the write enable signal nWE may be toggled at a time when the command CMD or the address ADDR is sent. Accordingly, the memory interface circuit 210 may acquire the command CMD or the address ADDR on the basis of the toggle timings of the write enable signal nWE.

The memory interface circuit 210 may receive a read enable signal nRE from the memory controller 100 through a fifth pin P15. The memory interface circuit 210 may receive the data strobe signal DQS from the memory controller 100 through a sixth pin P16, or send the data strobe signal DQS to the memory controller 100.

In a data DATA output operation of the nonvolatile memory device 200, the memory interface circuit 210 may receive the toggled read enable signal nRE through the fifth pin P15 before outputting the data DATA. The memory interface circuit 210 may generate the toggled data strobe signal DQS according to the toggling of the read enable signal nRE. For example, the memory interface circuit 210 may generate the data strobe signal DQS that starts to toggle after a predetermined delay (e.g., tDQSRE) with respect to the toggling start time of the read enable signal nRE. The memory interface circuit 210 may send a data signal DQ including the data DATA on the basis of the toggle timing of the data strobe signal DQS. Accordingly, the data DATA may be arranged at the toggle timing of the data strobe signal DQS and sent to the memory controller 100.

In a data DATA input operation of the nonvolatile memory device 200, when the data signal DQ including the data DATA is received from the memory controller 100, the memory interface circuit 210 may receive the toggled data strobe signal DQS together with the data DATA from the memory controller 100. The memory interface circuit 210 may acquire the data DATA from the data signal DQ on the basis of the toggle timing of the data strobe signal DQS. For example, the memory interface circuit 210 may acquire the data DATA by sampling the data signal DQ at a rising edge and a falling edge of the data strobe signal DQS.

The memory interface circuit 210 may send a ready/busy output signal nR/B to the memory controller 100 through an eighth pin P18. The memory interface circuit 210 may send the state information of the memory device 200 to the memory controller 100 through the ready/busy output signal nR/B. When the nonvolatile memory device 200 is in a busy state (e.g., when the internal operations of the memory device 200 are being performed), the memory interface circuit 210 may send the ready/busy output signal nR/B indicating the busy state to the memory controller 100. When the memory device 200 is in the ready state (e.g., when the internal operations of the memory device 200 are not performed or are completed), the memory interface circuit 210 may send the ready/busy output sigmal nR/B indicating the ready state to the memory controller 100. For example, while the memory device 200 reads the data DATA from the memory cell array 230 in response to a page read command, the memory interface circuit 210 may send the ready/busy output signal nR/B indicating the busy state (e.g., a low level) to the memory controller 100. For example, while the memory device 200 programs the data DATA into the memory cell array 230 in response to a program instruction, the memory interface circuit 210 may send the ready/busy output signal nR/B indicating the busy state to the memory controller 100.

The control logic 220 may control various operations of the memory device 200. The control logic 220 may receive the command/address CMD/ADDR from the memory interface circuit 210. The control logic 220 may generate control signals for controlling other components of the memory device 200 according to the received command/address CMD/ADDR. For example, the control logic 220 may generate various control signals for programming the data DATA in the memory cell array 230 or reading the data DATA from the memory cell array 230

The memory cell array 230 may store the data DATA acquired from the memory interface circuit 210 according to the control of the control logic 220. The memory cell array 230 may output the stored data DATA to the memory interface circuit 210 according to the control of the control logic 220.

The memory cell array 230 may include a plurality of memory cells. For example, the plurality of memory cells may be flash memory cells. However, the present inventive concept is not limited thereto, and the memory cells may be a RRAM cell, a FRAM cell, a Thyristor RAM (TRAM) cell, and a MRAM cell. Hereinafter, embodiments of the present inventive concept will be described with a focus on an embodiment in which the memory cells are NAND flash memory cells.

The memory controller 100 may include first, second, third, fourth, fifth, sixth, seventh and eighth pins P21, P22, P23, P24, P25, P26, P27 and P28, and a controller interface circuit 110. The first to eighth pins P21 to P28 may correspond to the first to eighth pins P11 to P18 of the nonvolatile memory device 200.

The controller interface circuit 110 may send the chip enable signal nCE to the nonvolatile memory device 200 through the first pin P21. The controller interface circuit 110 may send and receive signals to and from the nonvolatile memory device 200 which is selected through the chip enable signal nCE, through the second to eighth pins P22 to P28.

The controller interface circuit 110 may send the command latch enable signal CLE, the address latch enable signal ALE, and the write enable signal nWE to the nonvolatile memory device 200 through the second to fourth pins P22 to P24. The controller interface circuit 110 may send the data signal DQ to the memory device 200 through the seventh pin P27 or receive the data signal DQ from the nonvolatile memory device 200.

The controller interface circuit 110 may send the data signal DQ including the command CMD or the address ADDR along with a toggled enable signal nWE to the nonvolatile memory device 200. The controller interface circuit 110 may send the data signal DQ including the command CMD to the nonvolatile memory device 200 by sending the command latch enable signal CLE having the enable state, and may send the data signal DQ including the address ADDR to the memory device 200 by sending the address latch enable signal ALE having the enable state.

The controller interface circuit 110 may send the read enable signal nRE to the memory device 200 through the fifth pin P25. The controller interface circuit 110 may receive the data strobe signal DQS from the nonvolatile memory device 200 through the sixth pin P26, or may send the data strobe signal DQS to the nonvolatile memory device 200 through the sixth pin P26.

In the data DATA output operation of the nonvolatile memory device 200, the controller interface circuit 110 may generate a toggled read enable signal nRE, and send the read enable signal nRE to the nonvolatile memory device 200. For example, the controller interface circuit 110 may generate the read enable signal nRE that changes from the static state (e.g., a high level or a low level) to the toggle state before the data DATA is output. Accordingly, the toggled data strobe signal DQS may be generated on the basis of the read enable signal nRE in the nonvolatile memory device 200. The controller interface circuit 110 may receive the data signal DQ including the data DATA, along with the toggled data strobe signal DQS, from the nonvolatile memory device 200. The controller interface circuit 110 may acquire the data DATA from the data signal DQ on the basis of the toggle timing of the data strobe signal DQS.

In the data DATA input operation of the nonvolatile memory device 200, the controller interface circuit 110 may generate a toggled data strobe signal DQS. For example, the controller interface circuit 110 may generate a data strobe signal DQS that changes from the static state (e.g., a high level or a low level) to the toggle state, before sending the data DATA. The controller interface circuit 110 may send the data signal DQ including the data DATA to the nonvolatile memory device 200 on the basis of the toggle timing of the data strobe signal DQS.

The controller interface circuit 110 may receive a ready/busy output signal nR/B from the nonvolatile memory device 200 through the eighth pin P28. The controller interface circuit 110 may discriminate the state information of the nonvolatile memory device 200 on the basis of the ready/busy output signal nR/B.

Figure 3:
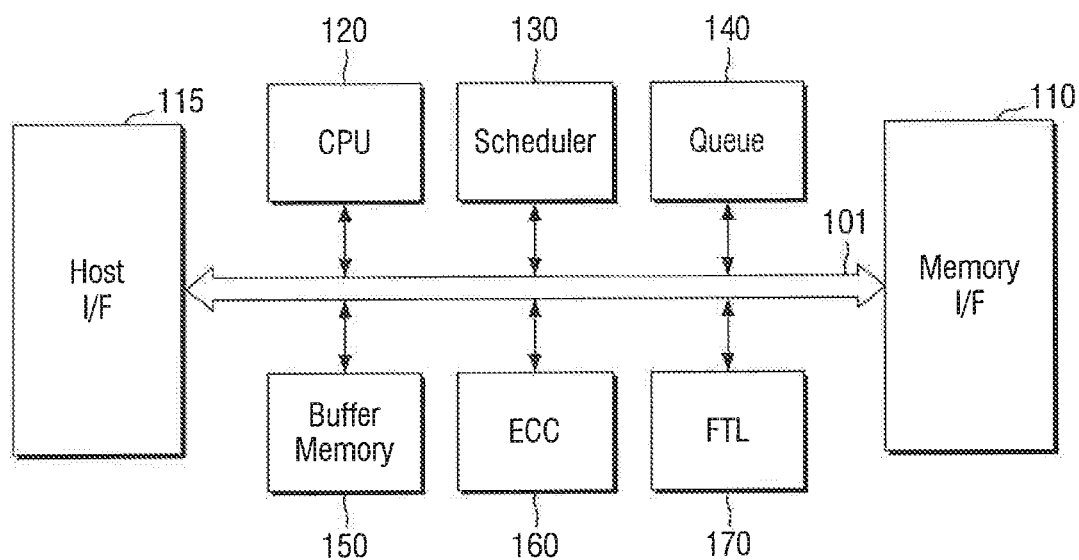
FIG. 3 is a diagram for explaining a memory controller according to some embodiments of the present inventive concept.

FIG. 3 is a diagram for explaining a memory controller according to some embodiments of the present inventive concept.

The memory controller 100 may include a host interface 115, a memory interface circuit 110, and a central processing unit (CPU) 120. Further, the memory controller 100 may include a buffer memory 150, an error correction code (ECC) engine 160 and a flash translation layer (FTL) 170. The memory controller 100 may further include a working memory into which the FTL 170 is loaded, and when the CPU 120 executes a flash translation layer, data record and read operations of the nonvolatile memory device 200 may be controlled.

The host interface 115 may send and receive packets to and from the host 1 (see FIG. 1). The packets sent from the host 1 to the host interface 115 may include a command, data to be written in the nonvolatile memory device 200, or the like. The packets sent from the host interface 115 to the host 1 may include a response to the command, data read from the nonvolatile memory device 200 or the like. The memory interface circuit 110 may send the data to be written in the nonvolatile memory device 200 to the nonvolatile memory device 200 or receive the read data from the nonvolatile memory device 200. Such a memory interface circuit 110 may be implemented to comply with a standard protocol such as Toggle or Open NAND Flash Interface Working Group (ONFI).

The CPU 120 controls the overall operation of the memory controller 100. For example, the CPU 120 may control operations associated with driving of the nonvolatile memory device 200. In other words, the CPU 120 may be controlled to read the data from the nonvolatile memory device 200 according to the command (for example, a read command) received from the host interface 115.

The CPU 120 may output commands to the nonvolatile memory device 200 in the sequence scheduled by a scheduler 130 according to some embodiments of the present inventive concept. For example, when the priority of a command CMD1 received from the host 1 is urgent, the CPU 120 may interrupt the operation of a command CMD2 currently being performed, and preferentially perform the operation of the command CMD1. For example, when the operation of the command CMD1 is completed, the CPU 120 resumes the operation of the interrupted command CMD2.

According to some embodiments of the present inventive concept, the command CMD2 may be an internal command for the management of a nonvolatile memory device, and the command CMD2 may be a read command requested from the host. The internal command may be, for example, a command associated with a garbage collection operation. According to some embodiments of the present inventive concept, the command CMD2 is a command received from a first host, the command CMD1 is a command received from a second host, and the request of the second host may be set so take precedence over the request of the first host.

For example, before resuming the operation of the command CMD2, when there is a command CMD3 to be performed subsequent to the command CMD1, the CPU 120 performs the operation of the command CMD3, and then resumes the operation of the command CMD2.

The command CMD3 may be a command received from the same host and associated with the command CMD1. In addition, the command CMD3 may be a command which was received from another host, e.g., a third host, but is more urgent than the command CMD2.

The scheduler 130 checks the priority of commands received through the host interface 115 and schedules their operation sequence depending on priority, according to some embodiments of the present inventive concept. The scheduler 130 generates a task required to generate commands to be provided to the nonvolatile memory unit 200 in response to commands received through the host interface 115, and may perform a control so that the tasks are processed through the CPU 120, according to some embodiments of the present inventive concept.

A queue 140 stores a plurality of commands received from the host interface 115, according to some embodiments of the present inventive concept. The queue 140 may store a plurality of tasks required to generate commands to be provided to the nonvolatile memory device 200 according to some embodiments of the present inventive concept. According to some embodiments of the present inventive concept, the queue 140 may be a plurality of queues.

As an example, the scheduler 130 may store more a urgent command in a first queue (Queue1 or Urgent Queue) on the basis of the command CMD2 currently being performed, and may store non-urgent command in a second queue (Queue2 or Normal Queue) on the basis of the command CMD2 currently being performed.

For example, when the command CMD1 is stored in the first queue while performing the command CMD2, the scheduler 130 may notify the CPU 120 that the command CMD1 is in the first queue. The CPU 120 may control the nonvolatile memory device 200 to postpone (or hold) the operation of the command CMD2 in response to the notification of the scheduler 130, and preferentially perform the operation of the command CMD1.

When the scheduler 130 receives a command CMD3 that needs to be performed following the command CMD1 before resuming the operation of the command CMD2, the scheduler 130 may store the command CMD3 in the first queue and notify the CPU 120 that the command CMD3 is in the first queue. At this time, the command CMD3 may also be a command dependent on the command CMD1 according to some embodiments of the present inventive concept. For example, the command CMD1 and the command CMD3 may be task-dependent first task Task1 and second task Task1 among a plurality of tasks generated in response to the command received from the first host. As an example thereof, the first task Task1 may include an address mapping L2P task which maps a logical address provided from the host 1 to a physical address used in the nonvolatile memory device 200, and the second task Task2 may include a task which determines a level of a read voltage applied to a nonvolatile memory cell of the nonvolatile memory device 200.

Alternatively, the scheduler 130 may have a command CMD3 with a higher priority than a command CMD2 according to some embodiments of the present inventive concept. As an example, a plurality of hosts 1 may have respective priorities according to some embodiments of the present inventive concept. If the command CMD2 is requested by the first host and the command CMD3 is requested by the second host, the second host may have a higher priority than the first host. In this case, the scheduler 130 may perform scheduling so that the commands of the second host, e.g., the command CMD3 in the above example, is first processed earlier than the commands of the first host, e.g., the command CMD2 in the above example. For scheduling as described above, the scheduler 130 distinguishes between commands to be processed before the command currently being performed and commands that may not be processed first, and may store them in different queues 140, depending on the priority associated therewith.

The buffer memory 150 may be an operating memory of the memory controller 100. The buffer memory 150 may include a volatile memory such as a static RAM (SRAM) and/or a dynamic RAM (DRAM), but may also include a nonvolatile memory such as a flash memory, a PRAM and/or a RRAM.

The ECC engine 160 may perform error detection and correction functions of the read data that is read from the nonvolatile memory device 200. For example, the ECC engine 160 may generate parity bits for the write data to be written on the nonvolatile memory device 200, and the parity bits thus generated may be stored in the nonvolatile memory device 200, together with the write data. When reading the data from the nonvolatile memory device 200, the ECC engine 160 may correct an error of the read data, using the parity bits read from the nonvolatile memory device 200 together with the read data, and output the read data with a corrected error.

The flash translation layer (FTL) 170 may perform various functions such as address mapping, wear-leveling, and garbage collection. The address mapping operation is an operation of changing a logical address received from a host into a physical address which is used for actually storing the data in the nonvolatile memory device 200. The wear-leveling is a technique for ensuring that blocks in the nonvolatile memory device 200 are used uniformly to prevent an excessive degradation of a particular block, and may be implemented, for example, through a firmware technique for balancing the erasure counts of the physical blocks. The garbage collection is a technique for ensuring an available capacity in the nonvolatile memory device 200 through a method of copying the valid data of the block to a new block and then erasing the existing block.

The memory interface circuit 110 may be implemented by a Direct Attached Storage (DAS) method in which the nonvolatile memory device 200 is directly connected with a dedicated cable. Further, for example, the memory interface circuit 110 may be implemented by various interface methods, such as an Advanced Technology Attachment (ATA), a Serial ATA (SATA), external SATA (e-SATA), a Small Computer Small interface (SCSI), Serial Attached SCSI (SAS), a Peripheral Component Interconnection (PCI), a PCI express (PCIe), NVM express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and a compact flash (CF) card interface.

Figure 4:
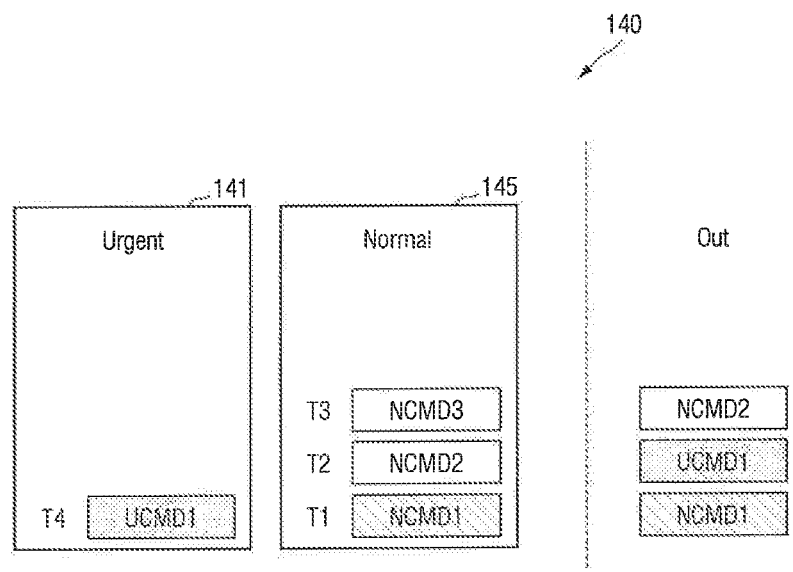
FIGS. 4 and 5 are diagrams for explaining the operation of Queue according to some embodiments of the present inventive concept.
Figure 5:
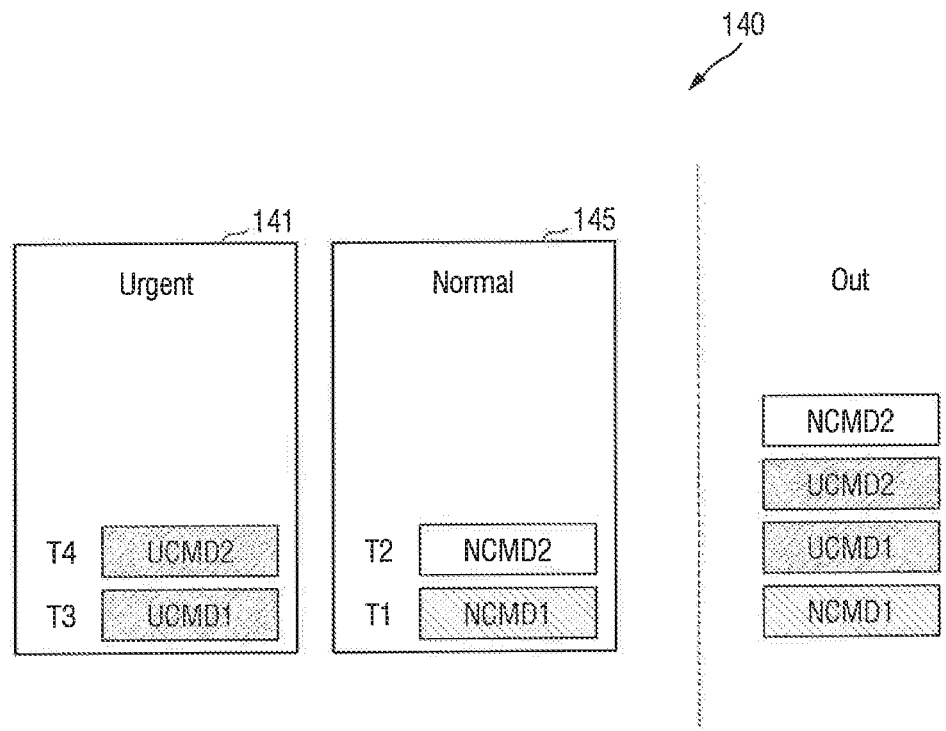

FIGS. 4 and 5 are diagrams for explaining the operation of Queue according to some embodiments of the present inventive concept. For convenience of explanation, it is assumed that the command currently being performed is NCMD1, and the commands are received in the sequence of T1 to T4.

Referring to FIGS. 4 and 5, the queue 140 may include a first queue (141, or an urgent queue) and a second queue (145, or a normal queue). The scheduler 130 may store commands with urgent priority in the urgent queue 141, and may store commands with non-urgent priority in the normal queue 145, on the basis of the command NCMD1 received at the time point of T1.

As an example, referring to FIG. 4, a case is supposed where normal commands NCMD1, NCMD2, and NCMD3 are received at the time points of T1, T2, and T3, and an urgent command UCMD1 is received at the time point of T4. In this case, the urgent command UCMD1 may be stored in the urgent queue, since the command UCMD1 has a higher operation priority (in other words, it is more urgent) than the command NCMD1 currently being performed.

When UCMD1 is received while NCMD1 is currently being performed, the scheduler 130 stores UCMD1 in the urgent queue 141 and notifies the CPU 120 that UCMD1 is in the urgent queue 141. The CPU 120 postpones (or holds) the read operation of NCMD1, even before the read operation of NCMD1 currently being performed is completed.

Next, the CPU 120 controls the nonvolatile memory device 200 to first perform the operation of UCMD1 present in the urgent queue 141. For example, the nonvolatile memory device 200 may perform a read operation of UCMD1 while the read operation of NCMD1 is paused.

When the subsequently received NCMD2 and NCMD3 have a lower priority than the postponed NCMD1, the scheduler 130 stores them in the normal queue 145, and may schedule the operation sequence so that the read operations of NCMD2 and NCMD3 are performed after completion of the read operation of NCMD1. In other words, if the urgent command UCMD1 is not received, the read operations of NCMD2 and NMCD3 are performed after the read operation of NCMD1 is completed. In addition, if the read operation of NCMD1 is paused until completion of the read operation of UCMD1, the read operations of NCMD2 and NMCD3 are not performed until after the read operation of NCMD1 is resumed and completed.

Referring to FIG. 5, as another example, a case is assumed where the commands are received as the normal commands NCMD1 and NCMD2 at the time points of T1 and T2, and the urgent commands UCMD1 and UCMD2 are received at the time points of T3 and T4. When UCMD1 is received while NCMD1 is currently being performed, UCMD1 is checked to see if it has a higher operation priority than NCMD1. When UCMD1 is the command that needs to be processed before NCMD1, the scheduler 130 stores UCMD1 in the urgent queue 141 and notifies the CPU 120 about UCMD1. The CPU 120 checks the command UCMD1 stored in the urgent queue 141 and postpones the read operation of NCMD1 currently being performed. Next, the CPU 120 controls the nonvolatile memory device 200 to perform the read operation of UCMD1 present in the urgent queue 141.

Even if UCMD2 (T4) is received later than NCMD2 (T2), when UCMD2 has a higher priority than NCMD1 and NCMD2, the scheduler 130 stores UCMD2 in the urgent queue 141, and outputs UCMD2 to the nonvolatile memory device 200 before performing NCMD2. The nonvolatile memory device 200 may preferentially perform the read operation of UCMD2 before resuming the postponed read operation of NCMD1. As an example, UCMD2 may be a command which has a higher priority than NCMD1 and NCMD2 and is processed first. As another example, UCMD2 may be a command which is associated with UCMD1 and needs to be processed first. The associated command may be, for example, related to Locality of data access of the nonvolatile memory device 200. Alternatively, as still another example, the associated command may be related to a task dependency between commands. Alternatively, when the priority of UCMD2 is less urgent than NCMD1 and more urgent than NCMD2, after the read operation of UCMD1 is completed, the read operation of NCMD1 is resumed and completed and after that, the read operation of UCMD2 may be performed. The read operation of NCMD2 may be performed upon completion of the read operation of UCMD2.

Figure 6:
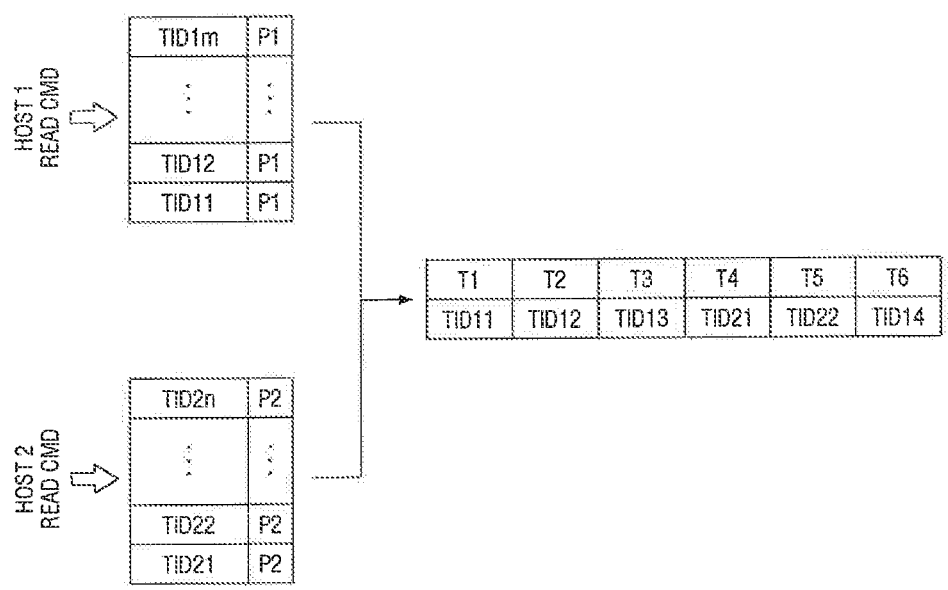
FIGS. 6 and 7 are diagrams for explaining the operation of the storage device according to some embodiments of the present inventive concept.
Figure 7:
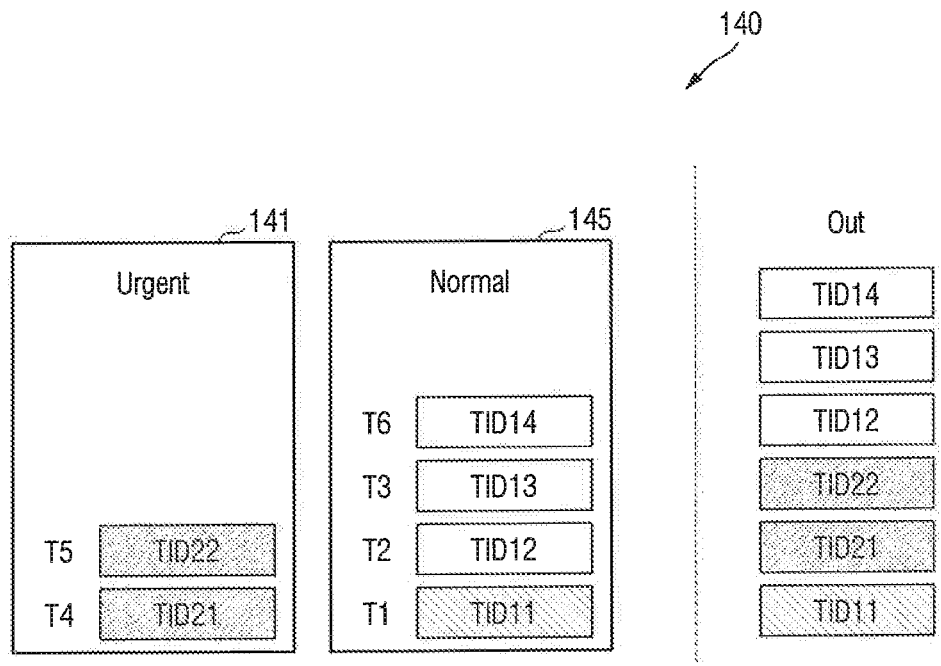

FIGS. 6 and 7 are diagrams for explaining the operation of the storage device according to some embodiments of the present inventive concept.

The memory controller 100 may each receive command from a plurality of hosts. For example, when the read command is received from the first host (Host1) and the second host (Host2), the memory controller 100 may generate a plurality of tasks corresponding to each read command. For example, it is assumed that TID11, and TID12 to TID1$m$ are generated in response to the read command of the first host, and TID21, and TID22 to TID2*n* are generated in response to the read command of the second host (m and n are natural numbers).

According to some embodiments of the present inventive concept, priority of operation sequence between the hosts may be set in a plurality of hosts. In the shown example, it is assumed that a host-specific operation priority of the first host is P1, and a host-specific operation priority of the second host is P2. The host-specific priority information may be included in read commands sent from the host according to an embodiment of the present inventive concept, and the host-specific priority information may be stored in the memory controller 100 according to another embodiment of the present inventive concept.

The plurality of tasks generated by the memory controller 100 may include host-specific priority information. The host-specific priority information may be included in the form of a tag or a header as an example, and may be information which is stored in the memory controller 100 as a mapping table or stored in a register or the like in another example.

As an example, it is assumed that that the host-specific priority P2 of the second host is higher (or urgent) than the host-specific priority P1 of the first host. In addition, the memory controller 100 may generate a plurality of tasks simultaneously or sequentially in response to the read command received from each host. For example, it is assumed that each of the tasks TID11, TID12, TID13, TID21, TID22, and TID14 is generated at the time points of T1 to T6.

First, the scheduler 130 may schedule to output the first generated task TID11 to the nonvolatile memory device 200. While the nonvolatile memory device 200 receives and processes the command corresponding to task. TID11, the scheduler 130 may receive the next task and schedule it according to the priority associated therewith. For example, since P2 is more urgent than P1, the next coming tasks TID12, TID13, TID21, TID22, and TID14 may be dividedly stored in the queue 140 with respect to the task TID11 currently being processed. For example, because task TID12 has the host-specific priority P1 from the same first host and is less urgent than task TID11, the scheduler 130 stores the task TID12 in the normal queue 145. Because task TID13 has the host-specific priority P1 from the same first host and is less urgent than task TID11, the scheduler 130 stores the task TID13 in the normal queue 145.

Because task TID21 has the host-specific priority P2 from the second host, which is a higher priority than P1, and is more urgent than task TID11, the scheduler 130 stores the task TID21 in the urgent queue 141. Because task TID22 has the host-specific priority P2 from the second host, which is a higher priority than P1, and is more urgent than task TID11, the scheduler 130 stores the task TID22 in the urgent queue 141.

Since there is a task stored in the urgent queue 141, even while the task TID11 is being processed in the nonvolatile memory device 200, the memory controller 100 sends the command corresponding to the task TID21 stored in the urgent queue 141 to the nonvolatile memory device 200. When the nonvolatile memory device 200 receives the task TID21 having a higher priority while performing the read operation corresponding to the task TID11, the nonvolatile memory device 200 postpones the operation corresponding to the task TID11 and performs the operation corresponding to the task TID21 first.

Subsequently, the memory controller 100 sends the command corresponding to the task TID22 stored in the urgent queue 141 to the nonvolatile memory device 200, and then may sequentially send the tasks TID12, TID13, and TID14 stored in the normal queue 145 to the nonvolatile memory device 200.

According to some embodiments of the present inventive concept, the task TID22 has a task-dependent relationship with the task TID21, and may be performed after TID21. Alternatively, according to some embodiments of the present inventive concept, since the task TID22 has a higher priority P2 than the task TID12 stored in the normal queue, it may be processed before TID12.

For example, upon completion of the operation corresponding to the task TID11, the nonvolatile memory device 200 performs the operation corresponding to the task TID21, resumes and completes the operation corresponding to the task TID11, and then performs the operations corresponding to the tasks TID12, TID13 and TID14 in order.

Figure 8:
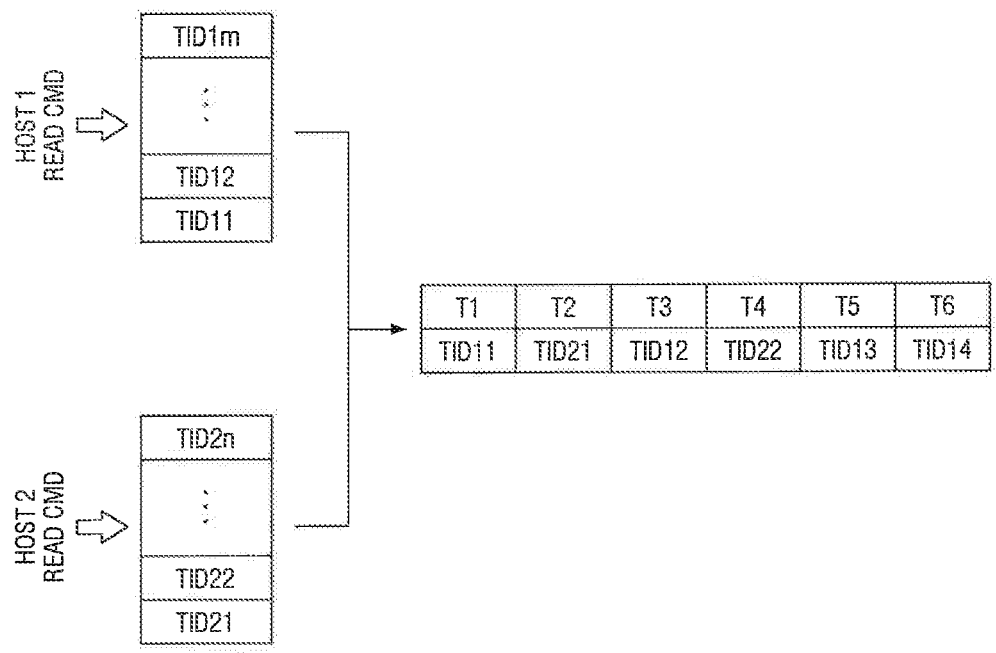
FIGS. 8 and 9 are diagrams for explaining the operation of the storage device according to some embodiments of the present inventive concept.
Figure 9:
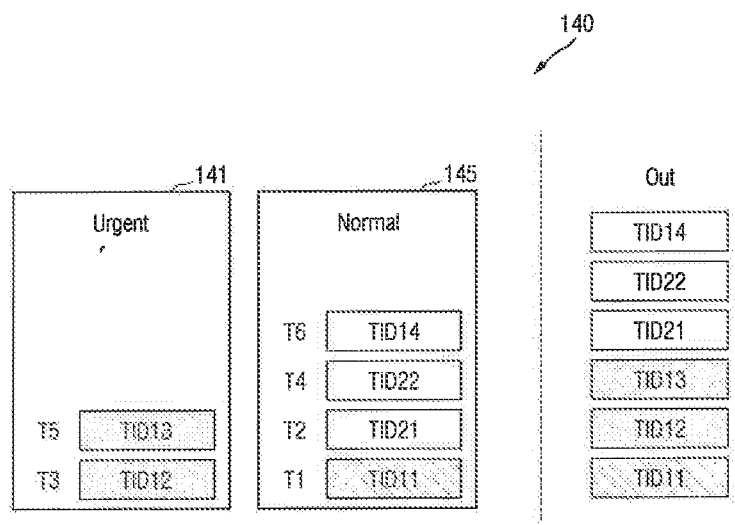

FIGS. 8 and 9 are diagrams for explaining the operation of the storage device according to some embodiments of the present inventive concept.

Referring to FIG. 8, the memory controller 100 may receive each command from a plurality of hosts. For example, when a read command is received from the first host (Host1) and the second host (Host2), the memory controller 100 may generate a plurality of tasks corresponding to each read command. For example, it is assumed that TID11, and TID12 to TID1*m* are generated in response to the read command of the first host, and TID21, and TID22 to TID2*n* are generated in response to the read command of the second host (m and n are natural numbers).

However, unlike FIG. 6, the first host and the second host may have the same host-specific priority as an example, or the host-specific priority may not be set as another example. In an embodiment of the present inventive concept, the memory controller 100 may generate a plurality of tasks simultaneously or sequentially in response to the read commands received from each host. For example, it is assumed that tasks TID11, TID21, TID12, TID22, TID13, and TID14 are each generated at the time points of T1 to T6.

First, the scheduler 130 may schedule to output the TID11 generated first to the nonvolatile memory device 200. While the nonvolatile memory device 200 receives and processes the command corresponding to task TID11, the scheduler 130 may receive the next tasks and schedule them according to the priorities associated therewith. In the shown example, the scheduler 130 may dividedly store the next incoming tasks TID21, TID12, TID22, TID13, and TID14 in the queue 140 on the basis of the task TID11 currently being processed.

For example, if the task TID12 was received from the same first host but is determined to be more urgent than the task TID11 currently being performed, the scheduler 130 stores the task TID12 in the urgent queue 141. If the task TID13 is a task which was also received from the same first host but is associated with the task TID12, the scheduler 130 stores the task TID13 in the urgent queue 141.

Further, if there is a task stored in the urgent queue 141, the memory controller 100 sends the command corresponding to the task TID12 stored in the urgent queue 141 to the nonvolatile memory device 200, even while the task TID11 is being processed in the nonvolatile memory device 200. When the nonvolatile memory device 200 receives the task TID12 having a higher priority while performing the read operation corresponding to the task TID11, the nonvolatile memory device 200 postpones the operation corresponding to the task TID11, and performs the operation corresponding to the task TID12 first. Further, since the task TID13 received next also has a higher priority than the task TID11, the nonvolatile memory device 200 performs the operation corresponding to the task TID13 first, and the operation corresponding to the TID11 remains postponed until completion of the task TID13.

Figure 10:
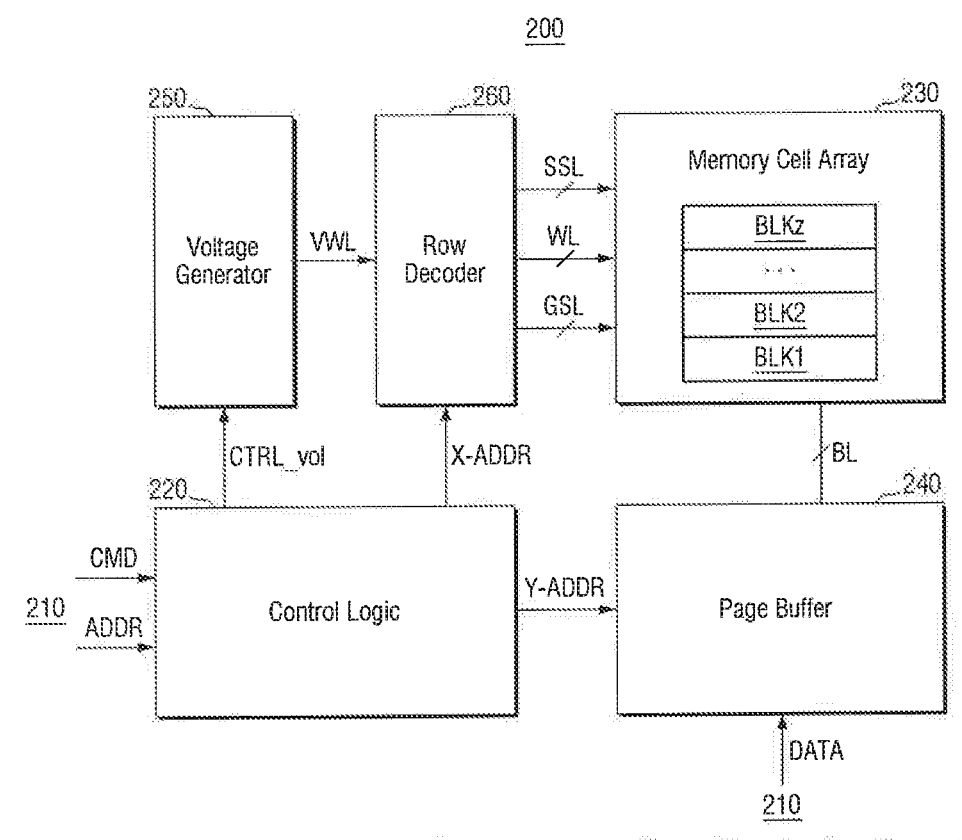
FIG. 10 is a diagram for explaining a nonvolatile memory device according to some embodiments of the present inventive concept.

FIG. 10 is a diagram for explaining a nonvolatile memory device according to some embodiments of the present inventive concept.

Referring to FIG. 10, the nonvolatile memory device 200 may include control logic 220, a memory cell array 230, a page buffer 240, a voltage generator 250, and a row decoder 260. The nonvolatile memory device 200 may further include a memory interface circuit 210 shown in FIG. 2, and may further include a column logic, a pre-decoder, a temperature sensor, a command decoder, an address decoder and the like.

The control logic 220 may control various operations inside the nonvolatile memory device 200. The control logic 220 may output various control signals in response to the command CMD and/or the address ADDR from the memory interface circuit 210. For example, the control logic 220 may output a voltage control signal CTRL_vol, a row address X-ADDR, and a column address Y-ADDR.

The memory cell array 230 may include a plurality of memory blocks BLK1 to BLKz (z is a positive integer), and each of the plurality of memory blocks BLK1 to BLKz may include a plurality of memory cells. The memory cell array 230 may be connected to the page buffer 240 through bit lines BL, and may be connected to the row decoder 260 through word lines WL, string selection lines SSL, and ground selection lines GSL.

In an embodiment of the present inventive concept, the memory cell array 230 may include a three-dimensional memory cell array, and the three-dimensional memory cell array may include a plurality of NAND strings. Each NAND string may include memory cells connected to word lines stacked vertically on the substrate. U.S. Pat. Nos. 7,679,133, 8,553,466, 8,654,587, 8,559,235, and U.S. Patent Application Publication No. 2011/0233648, which disclose three-dimensional memory cell arrays, are incorporated by reference herein in their entireties. In an embodiment of the inventive concept, the memory cell array 230 may include a two-dimensional memory cell array, and the two-dimensional memory cell array may include a plurality of NAND strings arranged along row and column directions.

The page buffer 240 may be connected to each of the memory cells through the bit lines BL. The page buffer 240 may select at least one bit line among the bit lines BL in response to the column address Y-ADDR. The page buffer 240 may operate as an entry driver or a detection amplifier, depending on the operating mode. For example, at the time of the program operation, the page buffer 240 may apply a bit line voltage corresponding to the data to be programmed to the selected bit line. At the time of the read operation, the page buffer 240 may detect the current or voltage of the selected bit line and detect the data stored in the memory cell. According to some embodiments of the present inventive concept, the page buffer 240 may include a plurality of page buffers. The page buffer 240 selectively activates a plurality of page buffers to correspond to commands received to the nonvolatile memory device 200 from the urgent queue 141 or the normal queue 145 described above, stores the read data, and then may output the data to the memory controller 100. The specific operation thereof will be described in FIG. 11.

The voltage generator 250 may generate various types of voltages for performing program, read, and erasure operations on the basis of the voltage control signal CTRL_vol. For example, the voltage generator 250 may generate a program voltage, a read voltage, a program verification voltage, an erasure voltage, and the like, as a word line voltage VWL.

The row decoder 260 may select one of the word lines WL in response to the row address X-ADDR, and select one of the string selection lines SSL. For example, the row decoder 260 may apply a program voltage and a program verification voltage to the selected word line at the time of the program operation, and may apply a read voltage to the selected word line at the time of the read operation.

Figure 11:
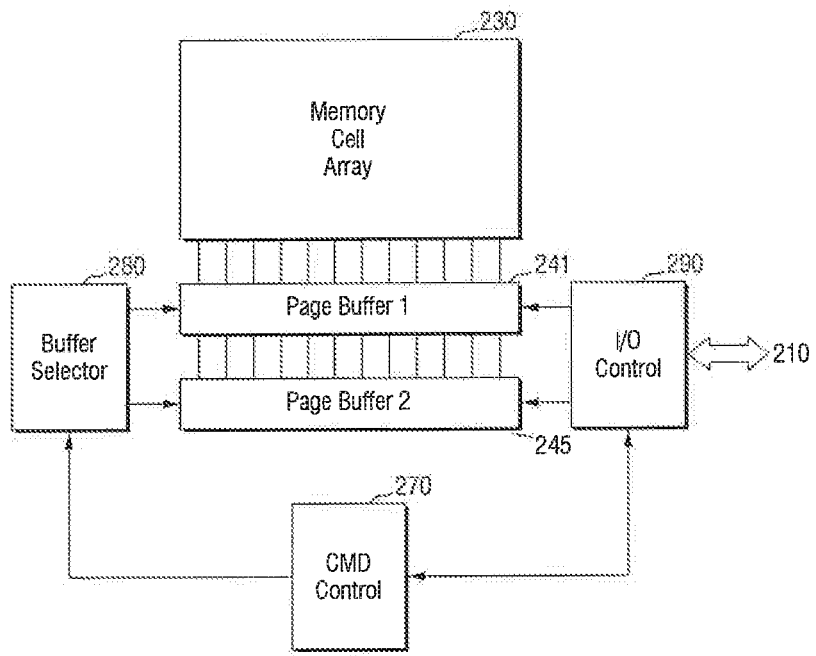
FIG. 11 is a diagram for explaining a nonvolatile memory device according to some embodiments of the present inventive concept.

FIG. 11 is a diagram for explaining a nonvolatile memory device according to some embodiments of the present inventive concept. The explanation will focus on the differences from FIG. 10, and a repeated explanation for these elements may not be provided.

The nonvolatile memory device 200 according to some embodiments of present inventive concept may further include a command control unit 270, a buffer selector 280, and an input/output (I/O) control unit 290.

When the command control unit 270 receives the command CMD1 from the memory controller 100, the command control unit 270 may control the operation sequence of the command to postpone the command CMD2 that currently performs the read operation, and preferentially perform the operation of the command CMD1. This is so, because the command CMD1 may have a higher priority level than the command CMD2.

The command CMD1 may have more urgent priority (or higher priority) than the command CMD2. The operation sequence of the command CMD1 and the command CMD2 may be defined by the host-specific priority in an embodiment of the present inventive concept, or may be defined by the memory controller 100 in another embodiment of the present inventive concept. In still another embodiment of the present inventive concept, the operation sequence between the commands may be defined on the basis of the priority according to the criteria that is set by the command control unit 270.

The command control unit 270 may be a module included in the control logic 220 according to an embodiment of the present inventive concept, and may be a module that is placed separately from the control logic 220 according to another embodiment of the present inventive concept.

The page buffer 240 may include a plurality of page buffers. For example, when a first page buffer 241 and a second page buffer 245 are included, the respective page buffers 241 and 245 may be enabled by the buffer selector 280 to store the data to be read from the memory cell array 230 or may be enabled to receive the data to be programmed in the memory cell array 230.

The buffer selector 280 may select one of the first and second page buffers 241 and 245 according to the control of the command control unit 270.

The I/O control unit 290 outputs the data of the selected page buffer among the first and second page buffers 241 and 245 through the memory interface circuit 210 according to the control of the command control unit 270, or receives data to be programmed through the memory interface circuit 210 and stores the data in the selected page buffer.

According to some embodiments of the present inventive concept, the data DATA1 of the command CMD1 may be stored in the first page buffer 241, and the data DATA2 of the command CMD2 may be stored in the second page buffer 245, according to the selection of the buffer selector 280. According to some embodiments of the present inventive concept, the buffer selector 280 stores the data DATA2 in the second page buffer 245 at the time of the read operation of the command CMD2, and when the operation of the command CMD2 is interrupted, the buffer selector 280 disables the second page buffer 245 at a point where only a part of the data DATA2 is stored. The buffer selector 280 then selects the first page buffer 241 and stores the data DATA1 at the time of the read operation of the command CMD1, which is to be performed first due to its higher priority, and when the read operation of the command CMD1 is completed, the I/O control unit 290 outputs the data stored in the first page buffer 241 to the memory interface circuit 210. The operation of the interrupted command CMD2 is resumed according to the control of the command control unit 270, and the second page buffer 245 is enabled again to store the rest of the data DATA2.

Figure 12:
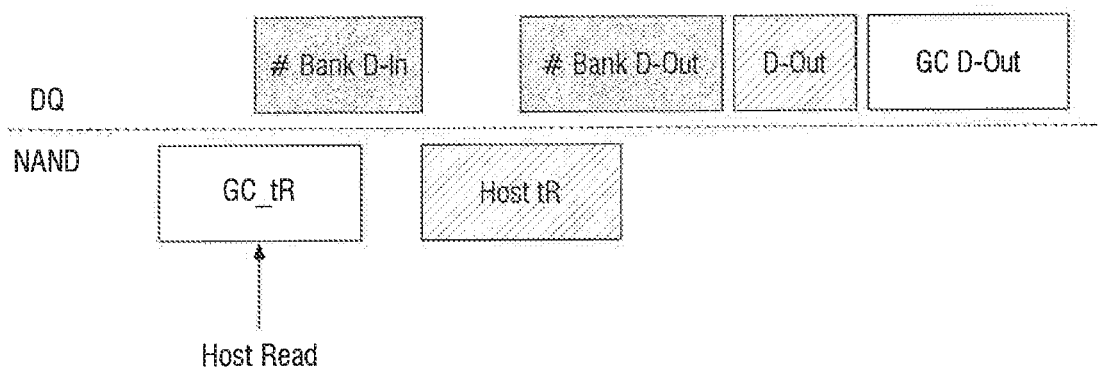
FIG. 12 is a diagram for explaining the read operation of the nonvolatile memory device according to some embodiments of the present inventive concept.

FIG. 12 is a diagram for explaining the read operation of the nonvolatile memory device according to some embodiments of the present inventive concept.

Referring to FIG. 12, according to some embodiments of the present inventive concept, the memory controller 100 and the nonvolatile memory device 200 send and receive commands and data through a channel (e.g., DQ bus, P17 of FIG. 2). The illustrated symbol tR may be the time at which the data read from the memory cell array 230 in the nonvolatile memory device 200 is stored in the page buffer 240. The illustrated symbol D-OUT may be the time at which the memory interface circuit 210 of the nonvolatile memory device 200 outputs data through the channel.

When the nonvolatile memory device 200 (NAND) receives the second command (Host Read) according to the read request from the host 1 while performing the current first command GC_tR, if the second command is determined to be more urgent than the first command, the memory controller 100 postpones the operation of the current command GC_tR and preferentially performs the operation of the second command Host Read (Host tR) to output data (D-Out), and resumes the postponed read operation of first command GC_tR to output data (GC D-Out).

Figure 13:
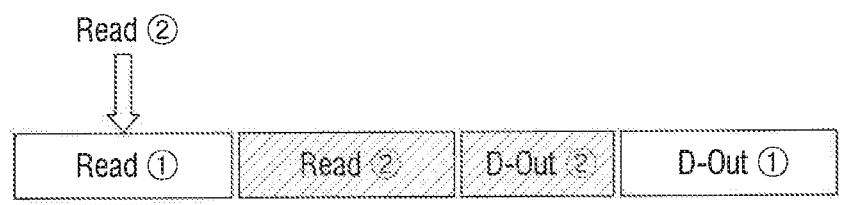
FIGS. 13, 14 and 15 are diagrams for explaining the read operation of the nonvolatile memory device according to some embodiments of the present inventive concept.
Figure 15:
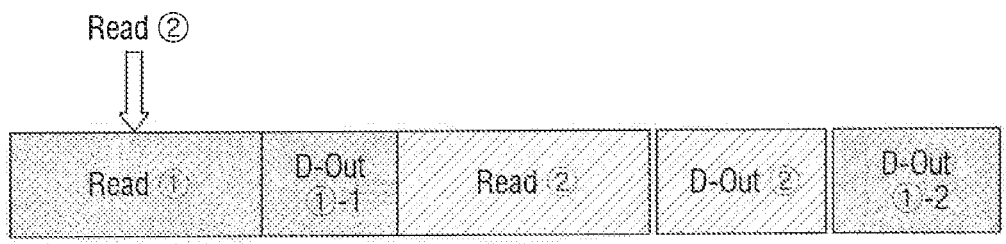

FIGS. 13 and 15 are diagrams for explaining the read operation of the nonvolatile memory device according to some embodiments of the present inventive concept.

Referring to FIG. 13, when the memory controller receives the second command (Read ②) while the data read operation of the current first command (e.g., GC_tR of FIG. 8) is being performed (Read ①), the operation of Read ① is postponed, and data access (Host tR, Read ②) of the second command is performed first. The nonvolatile memory device resumes the postponed operation of the first command, while outputting the data corresponding to the second command performed first (D-Out ②), and reads and outputs the data corresponding to the first command (D-Out ①)

Figure 14:
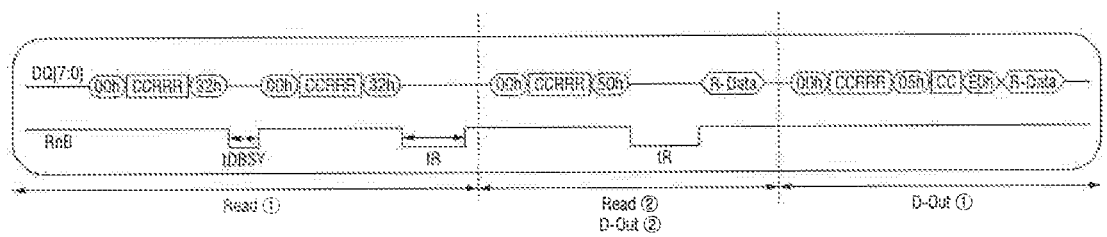

Referring to FIG. 14, when the first command (e.g., 32 h of the DQ bus) is sent through the DQ bus according to the simplified timing diagram of FIG. 13, as shown in the ready/busy output signal RnB, the data corresponding to the first command are read from the nonvolatile memory device 200 (tDBSY). However, if a more urgent second command is subsequently received (for example, 50 h of the DQ bus), the output of the data of the first command is postponed, and the read operation of the second command is performed first (tR), and the read data is output (R-DATA ②). After that, the postponed data read operation of the first command is performed to output the data (R-Data ①).

Referring to FIG. 15, unlike FIG. 13, the time point at which the nonvolatile memory device 200 receives the second command (Read ②) from the memory controller is the time during which the first command (Read ①) is performed and the first data is read (D-Out ①-1). In the shown example, the buffer selector selects another second page buffer, other than the first page buffer that is currently selected and stores the first data, performs the read operation of the second command (Read ②) first, and stores it in the second page buffer. As soon as the extraction of the second data of the second command into the second page buffer is completed (D-Out ②), the buffer selector disables the second page buffer, selects the first page buffer, and may resume the operation of the first command (D-Out ①-2).

Figure 16:
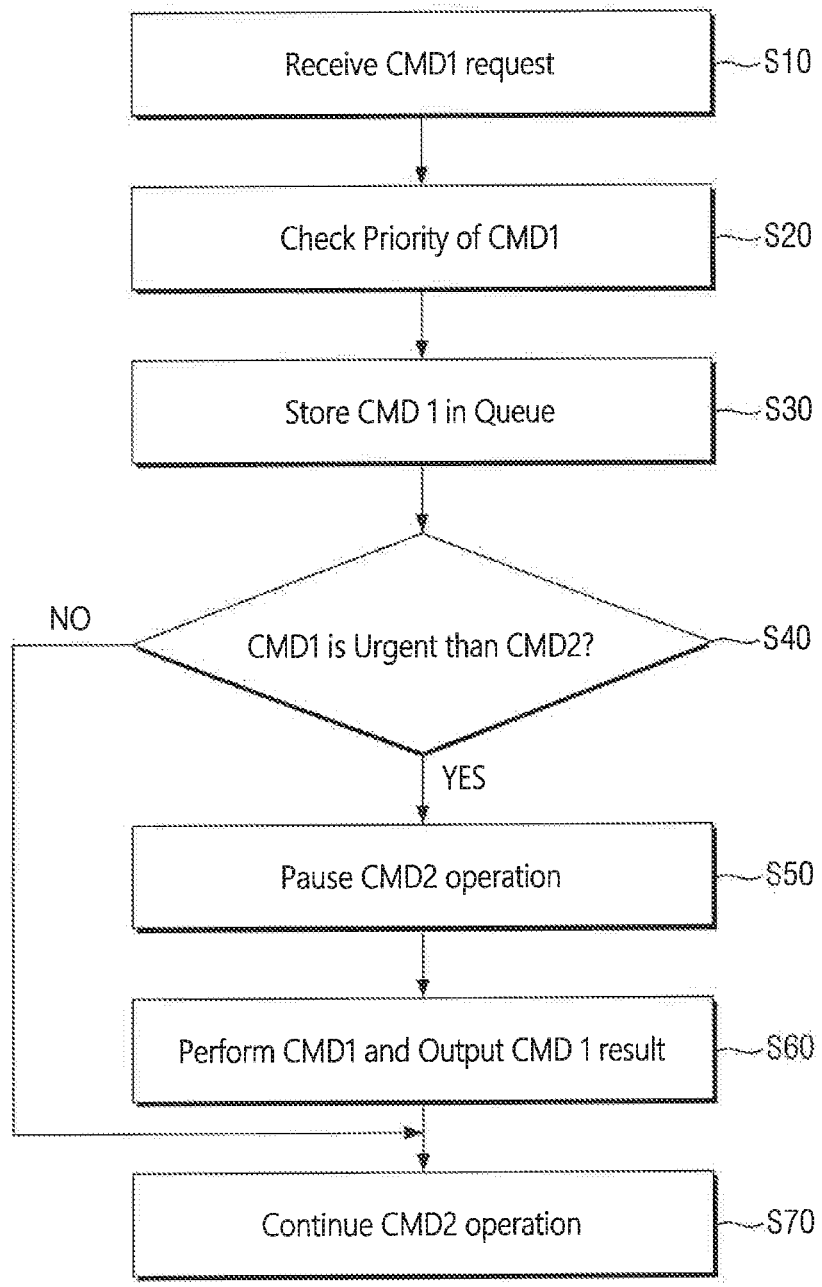
FIG. 16 is a flowchart for explaining a method for operating the memory controller according to some embodiments of the present inventive concept.

FIG. 16 is a flowchart for explaining a method for operating the memory controller according to some embodiments of the present inventive concept.

Referring to FIG. 16, according to some embodiments of the present inventive concept, the memory controller receives the command CMD1 from the first host among the plurality of hosts (S10). The memory controller checks the priority of the command CMD1 on the basis of the second command currently being performed (S20).

The priority may be a host-specific priority defined between the plurality of hosts according to some embodiments of the present inventive concept. For example, the command P2 of the second host may be set to be processed before the command P1 of the first host. Alternatively, the priority may be determined depending on the type of commands, according to some embodiments of the present inventive concept. As an example, when the command is an internal command for managing the nonvolatile memory device, the command received from the external host may be set to be preferentially processed. As another example, when a second command associated with the first command is received for the first command that is preferentially received from the external host and performed before the internal command, after completion of operation of the first command, the second command may be performed before the internal command.

The memory controller may store the command to be performed in the queue on the basis of the priority of the command CMD1 (S30). According to some embodiments of the present inventive concept, it is checked whether the received command CMD1 is a more urgent command than the command CMD2 currently being performed (S40).

When the command CMD1 is more urgent than the command CMD2, the operation of the command CMD2 currently being performed is postponed (S50), and the operation of the command CMD1 is performed first. When the data read according to the operation of the command CMD1 in the nonvolatile memory device is completed, the nonvolatile memory device resumes the postponed operation of the command CMD2.

On the other hand, according to some embodiments of the present inventive concept, if there is a command CMD3 that needs to be performed following the command CMD1 before the postponed operation of the command CMD2 resumes, after performing the operation of the command CMD3, the operation of the command CMD2 may be resumed.

The command CMD3 may be a command which is received from the same host and associated with the command CMD1 according to an embodiment of the present inventive concept. In addition, the command CMD3 may be a command which is received from another host, but has a higher priority than the command CMD2 according to another embodiment of the present inventive concept.

According to the method for operating the memory controller according to some embodiments of the present inventive concept, even in a complicated workload situation in which a plurality of read commands are received by the storage device, since the urgent data read request is preferentially processed, latency of a data access operation may be improved, and Quality of Service (Qos) may be improved.

Figure 17:
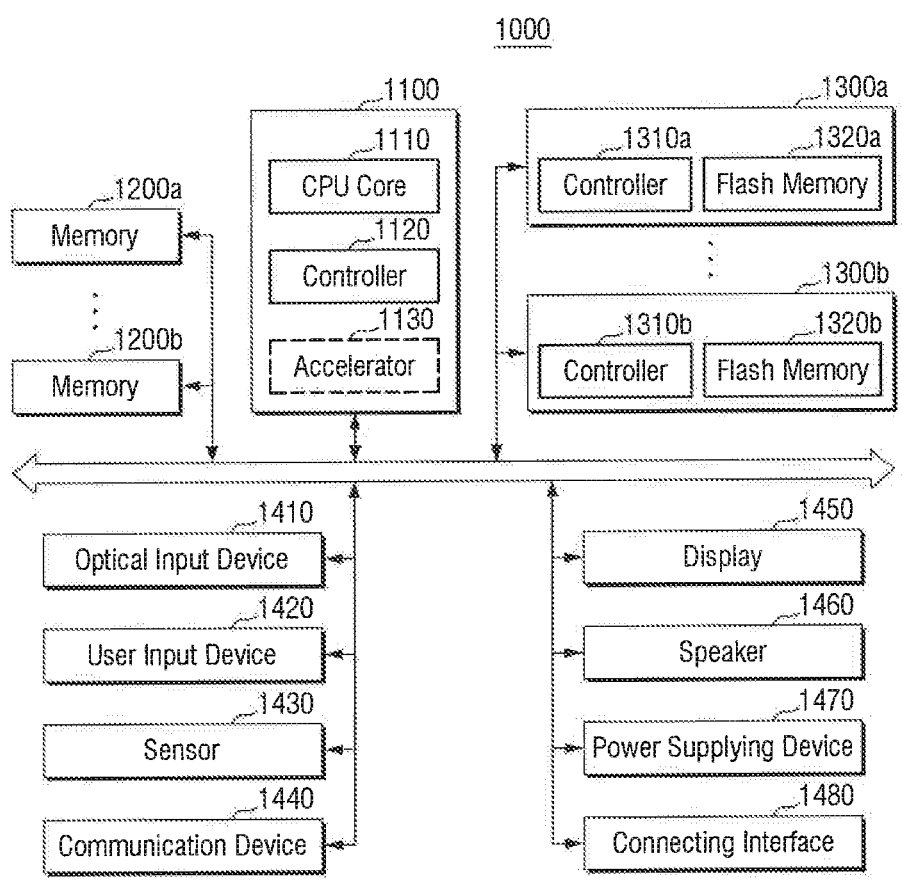
FIG. 17 is a diagram for explaining an electronic device including a storage device according to some embodiments of the present inventive concept.

FIG. 17 is a diagram for explaining an electronic device including a storage device according to some embodiments of the present inventive concept.

A system 1000 of FIG. 17 may be a mobile system, such as a mobile phone, a smart phone, a tablet personal computer (PC), a wearable device, a healthcare device or an internet of things (IOT) device. However, the system 1000 of FIG. 17 is not necessarily limited to a mobile phone system, but may also be a personal computer, a laptop computer, a server, a media player, or an automotive device such as navigation.

Referring to FIG. 17, the system 1000 may include a main processor 1100, memories 1200a and 1200b, and storage devices 1300a, 1300b, and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, for example, the operation of other components that make up the system 1000. Such a main processor 1100 may be implemented by a general purpose processor, a dedicated processor, an application processor, or the like.

The main processor 1100 may include one or more CPU cores 1110, and may further include a controller 1120 for controlling the memories 1200a and 1200b and/or storage devices 1300a and 1300b. The main processor 1100 may further include an accelerator block 1130, which is a dedicated circuit for a high-speed data computation such as an artificial intelligence (AI) data computation. Such an accelerator block 1130 may include a Graphics Processing Unit (GPU), a Neural Processing Unit (NPU) and/or a Data Processing Unit (DPU), and the like, and may be implemented as separate chips that are physically independent of other components of the main processor 1100.

The memories 1200a and 1200b may be used as a main memory unit of the system 1000, and may include a volatile memory such as an SRAM and/or a DRAM, but may also include a nonvolatile memory such as a flash memory, a PRAM and/or a RRAM. The memories 1200a and 1200b may also be implemented in the same package as the main processor 1100.

The storage devices 1300a and 1300b may function as a nonvolatile storage device for storing data regardless of whether a power is supplied, and may have a relatively large capacity as compared with the memories 1200a and 1200b. The storage devices 1300a and 1300b may include storage controllers 1310a and 1310b, and nonvolatile memory (NVM) storages 1320a and 1320b that store data under the control of the storage controllers 1310a and 1310b. The nonvolatile memories 1320a and 1320b may include a V-NAND flash memory of a 2D structure or a 3D structure, but may also include other types of nonvolatile memory such as a PRAM and/or a RRAM.

The storage devices 1300a and 1300b may be included in the system 1000 in a state of being physically separated from the main processor 1100, and may be implemented in the same package as the main processor 1100. Further, the storage devices 1300a and 1300b have a shape such as a solid state device (SSD) or a memory card, and thus, may also be detachably coupled with other components of the system 1000 through an interface such as a connecting interface 1480 to be described later. Such storage devices 1300a and 1300b may be, but are not necessarily limited to, devices to which standard protocols such as a UFS, an eMMC or an NVMe are applied.

The image capturing device 1410 (or optical input device) may capture still images or moving images, and may be a camera, a video camera (e.g., camcorder), and/or a webcam and the like.

The user input device 1420 may receive various types of data input from users of the system 1000, and may be a touch pad, key pad, a key board, a mouse and/or a microphone.

The sensor 1430 may detect various types of physical quantities that may be acquired from the outside of the system 1000, and convert the detected physical quantities into electrical signals. Such a sensor 1430 may be a temperature sensor, a pressure sensor, an illuminance sensor, a position sensor, an acceleration sensor, a biosensor and/or a gyroscope.

The communication device 1440 may send and receive signals to and from other devices outside the system 1000 according to various communication protocols. Such a communication device 1440 may be implemented by including an antenna, a transceiver and/or a modem and the like.

The display 1450 and the speaker 1460 may function as output devices that output visual and auditory information to the user of the system 1000, respectively.

The power supplying device 1470 may convert the power supplied from a battery and/or an external power supply equipped in the system 1000 and supply the power to each component of the system 1000.

The connecting interface 1480 may provide a connection between the system 1000 and an external device that is connected to the system 1000 and may send and receive data to and from the system 1000. The connecting interface 1480 may be implemented by various interface methods, such as an ATA, a SATA, an e-SATA, a SCSI, a SAS, a PCI, a PCIe, a NVMe, an IEEE 1394, a USB, an SD card, a MMC, an eMMC a UFS, an eUFS, and a CF card interface.

Figure 18:
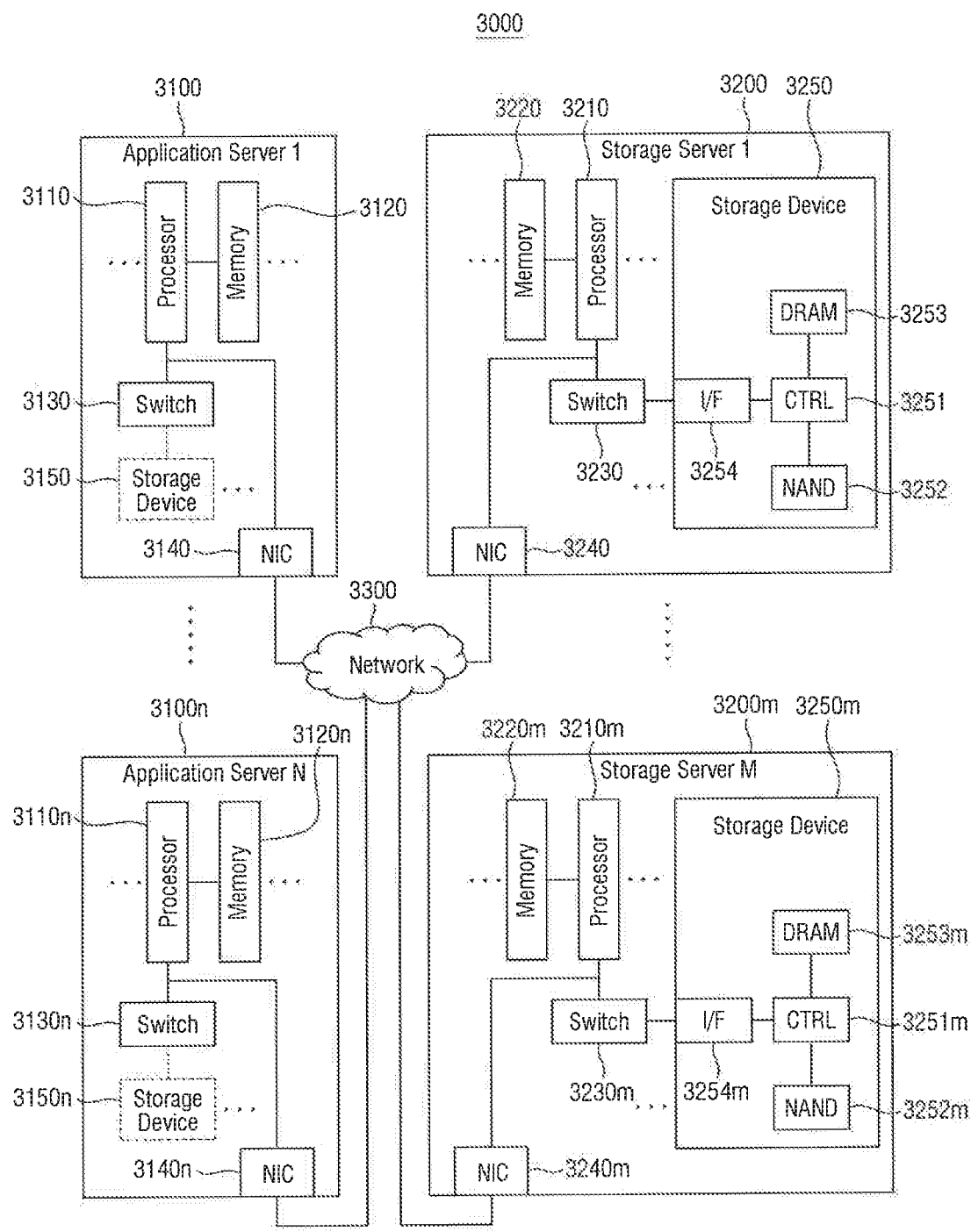
FIG. 18 is a diagram for explaining a data center including a storage device according to some embodiments of the present inventive concept.

FIG. 18 is a diagram for explaining a data center including a storage device according to some embodiments of the present inventive concept. A storage device 3250 of FIG. 18 may be implemented as the storage device 10 according to some of the above-described embodiments.

Referring to FIG. 18, a data center 3000 is a facility that gathers various types of data and provides services, and may be called a data storage center. The data center 3000 may be a system for search engines and database operations, and may be a computing system used by corporations such as banks or government agencies. The data center 3000 may include application servers 3100 to 3100n and storage servers 3200 to 3200m. The number of application servers 3100 to 3100n and the number of storage servers 3200 to 3200m may be variously selected, and the number of application servers 3100 to 3100n and the number of storage servers 3200 to 3200m may be different from each other.

The application server 3100 or the storage server 3200 may include at least one of the processors 3110 and 3210 and the memories 3120 and 3220. Taking the storage server 3200 as an example, the processor 3210 may control the overall operation of the storage server 3200, and access the memory 3220 to execute commands and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM or a Non-Volatile DIMM (NVM DIMM). The number of processors 3210 and the number of memories 3220 included in the storage server 3200 may be variously selected. In an embodiment of the present inventive concept, the processor 3210 and the memory 3220 may provide a processor-memory pair. In an embodiment of the present inventive concept, the number of processors 3210 and the number of memories 3220 may be different from each other. The processor 3210 may include a single core processor or a multi-core processor. The aforementioned explanation of the storage server 3200 may also be similarly applied to the application server 3100. The application server 3100 may not include a storage device 3150. The storage server 3200 may include at least one or more storage devices 3250. The number of storage devices 3250 included in the storage server 3200 may be variously selected.

The application servers 3100 to 3100n and the storage servers 3200 to 3200m may communicate with each other through a network 3300. The network 3300 may be implemented, using a Fibre Channel (FC), an Ethernet, or the like. At this time, FC is a medium used for a relatively high-speed data transfer, and may use an optical switch that provides high performance/high availability. The storage servers 3200 to 3200m may be provided as file storage, a block storage or an object storage, depending on an access type of the network 3300.

For example, the network 1300 may be implemented, according to protocols such as an FC over Ethernet (FCoE), a Network Attached Storage (NAS), and a NVMe over Fabrics (NVMe-oF).

Hereinafter, the application server 3100 and the storage server 3200 will be mainly described. The explanation of the application server 3100 may also be applied to another application server 3100n, and the explanation of the storage server 3200 may also be applied to another storage server 3200m.

The application server 3100 may store the data requested to store by a user or client in one of the storage servers 3200 to 3200m through the network 3300. Further, the application server 3100 may acquire the data requested to read by the user or client from one of the storage servers 3200 to 3200m through the network 3300. For example, the application server 3100 may be implemented by a Web server or a Database Management System (DBMS).

The application server 3100 may access the memory 3120n or the storage device 3150n included in another application server 3100n through the network 3300, or may access the memories 3220 to 3220m or the storage devices 3250 to 3250m included in the storage servers 3200 to 3200m through the network 3300. Accordingly, the application server 3100 may perform various operations on the data stored in the application servers 3100 to 3100n and/or the storage servers 3200 to 3200m. For example, the application server 3100 may execute commands for moving or copying the data between the application servers 3100 to 3100n and/or the storage servers 3200 to 3200m. For example, the data may be moved from the storage devices 3250 to 3250m of the storage servers 3200 to 3200m via the memories 3220 to 3220m of the storage servers 3200 to 3200m or directly to the memories 3120 to 3120n of the application servers 3100 to 3100n. Data moving through the network 3300 may be data encrypted for security and privacy.

Taking the storage server 3200 as an example, an interface 3254 may provide a physical connection between the processor 3210 and a controller 3251, and a physical connection between a NIC 3240 and the controller 3251.

The storage server 3200 may further include a switch 3230 and the NIC 3240. The switch 3230 may selectively connect the processor 3210 and the storage device 3250 or may selectively connect the NIC 3240 and the storage device 3250 according to the control of the processor 3210. The application servers 3100 to 3100n may further include switches 3130 to 3130n.

In an embodiment of the present inventive concept, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a digital signal processor (DSP), a host bus interface, or the like, and may be connected to the processor 3210, and/or the switch 3230, or the like through the host bus interface. The host bus interface may also be implemented as one of the examples of the interface 3254 described above. In an embodiment of the present inventive concept, the NIC 3240 may also be integrated with at least one of the processor 3210, the switch 3230, and the storage device 3250.

In the storage servers 3200 to 3200m or the application servers 3100 to 3100n, the processors 3110 and 3210 may send the commands to the storage devices 3150 to 3150n and 3250 to 3250m or the memories 3120 to 3120n and 3220 to 3220m to program or read the data. At this time, the data may be data in which an error is corrected through an ECC engine. The data is data subjected to data bus inversion (DBI) or a data masking (DM) process, and may include CRC (Cyclic Redundancy Code) information. The data may be data that is encrypted for security and privacy.

The storage devices 3150 to 3150m and 3250 to 3250m may send the control signal and command/address signal to NAND flash memory devices 3252 to 3252m in response to the read command received from the processor. Accordingly, when data is read from the NAND flash memory devices 3252 to 3252m, the Read Enable (RE) signal is input as a data output control signal, and may serve to output the data to the DQ bus. A Data Strobe (DQS) may be generated, using the RE signal. Command and address signals may be latched to the page buffer, depending on a rising edge or a falling edge of a Write Enable (WE) signal.

The controller 3251 may control the operation of the storage device 3250. In an embodiment of the present inventive concept, the controller 3251 may include a SRAM. The controller 3251 may write data in the NAND flash 3252 in response to a write command, or may read the data from the NAND flash 3252 in response to a read command. For example, the write command and/or the read command may be provided from the processor 3210 in the storage server 3200, the processor 3210m in another storage server 3200m, or the processors 3110 and 3110n in the application servers 3100 and 3100n. A DRAM 3253 may temporarily store (e.g., buffer) the data to be written in the NAND flash 3252 or the data read from the NAND flash 3252. In addition, the DRAM 3253 may store meta data. The meta data may be a user data or data generated by the controller 3251 to manage the NAND Rash 3252. The storage device 3250 may include a Secure Element (SE) for security or privacy.

It is to be understood that those skilled in the art will appreciate that many variations and modifications may be made to the embodiments described herein without departing from the scope of the present inventive concept. Therefore, the present inventive concept is not limited to the embodiments described herein.

What is claimed is:

1. A method for operating a memory controller, the method comprising:
  receiving a first command from a first host;

storing the first command in a queue, wherein the queue includes an urgent queue for storing urgent commands and a normal queue for storing normal commands;

when the first command has a higher priority than a second command currently being performed, storing the first command in the urgent queue, pausing an operation of the second command and performing a read operation of the first command;

continuing the operation of the second command after completion of the read operation of the first command; and when the first command has a lower priority than the second command, sequentially storing the first command in the normal queue.

2. A memory controller, comprising:
a host interface which receives a plurality of commands and outputs data corresponding to the commands;
a queue which stores the commands received at the host interface; and
a central processing unit (CPU) which reads data from a nonvolatile memory device according to the commands in the queue on the basis of an operation sequence that was scheduled depending on a priority of the commands in the queue,
wherein when a first command is received that is more urgent than a second command currently being performed, an operation of the second command is held, and an operation of the first command is performed,
wherein the queue includes:
an urgent queue which stores an urgent command; and
a normal queue which stores a normal command,
wherein when a priority of the first command is more urgent than a priority of the second command, the first command is stored in the urgent queue, when the priority of the first command is less urgent than the second command, the first command is sequentially stored in the normal queue.

3. The memory controller of claim 2, wherein the CPU performs the operation of the first command, and then performs a remaining operation of the held second command.

4. The memory controller of claim 2, wherein when a third command is received that has a more urgent priority than the second command, the third command after the first command is stored in the urgent queue, the operation of the first command is queued to be performed and then an operation of the third command is queued to be performed after the operation of the first command is completed.

5. The memory controller of claim 2, wherein when a third command is received and is dependent on the first command, the third command is stored in the urgent queue, the operation of the first command is queued to be performed and then an operation of the third command is queued to be performed after the operation of the first command is completed.

6. A method for operating a nonvolatile memory device, the method comprising:
in response to a first command, postponing an operation of a second command currently being performed and performing an operation of the first command;
selecting one of a plurality of page buffers to store data corresponding to the first command or the second command; and
outputting data of the selected page buffer,
wherein the plurality of page buffers include:
a first page buffer which stores a first data of the first command; and
a second page buffer which stores a second data of the second command,
wherein the method further includes selecting the first page buffer, while the operation of the first command is being performed,
selecting the second page buffer, while the operation of the second command is being performed, and
outputting the first data stored in the first page buffer to a memory controller before the second data is output.

7. The method of claim 6, wherein the second command is paused by memory controller, and the operation of the first command is performed in the nonvolatile memory device.

8. The method of claim 6, wherein the operation of the first command is performed before the operation of the second command when the first command is more urgent than the second command.

9. The method of claim 6, wherein the second page buffer is not selected while the operation of the second command is being interrupted, and the the second page buffer is selected when the operation of the second command is resumed.

10. The method of claim 6, wherein an empty page buffer among the plurality of page buffers is selected to store the data of the first command, when the operation of the second command is interrupted and the operation of the first command is performed.

11. The method of claim 6, wherein data corresponding to an urgent command among the first command or the second command is output first.

12. A data center, comprising:
a first host which sends a first read command;
a second host which sends a second read command; and
a storage device which generates a plurality of tasks corresponding to the first and second read commands, and schedules an operation sequence of the tasks according to a priority to perform an operation,
wherein when a more urgent second task among the plurality of tasks is received while an operation of a first task among the plurality of tasks is being performed, the storage device stores the second task in an urgent queue, performs the operation of the second task before completing the operation of the first task, and then continues the operation of the first task, when the second task is more urgent than the first task, and
when the second task is less urgent than the first task, the storage device sequentially stores the second task in a non al queue.

13. The data center of claim 12, wherein the storage device includes:
a memory controller which generates the plurality of tasks corresponding to the first and second read commands, and schedules and outputs the operation sequence of the tasks according to a dependency between respective tasks or a priority of the first and second hosts; and
a nonvolatile memory device which pauses an operation of a current task and preferentially performs the operation of the second task, when the more urgent second task is received.

* * * * *